United States Patent Office
3,764,456
Patented Oct. 9, 1973

3,764,456
POLYMERIC HIGH PERFORMANCE COMPOSITES
Raymond T. Woodhams, Toronto, Ontario, Canada, assignor to Canadian Patents and Development Limited, Ottawa, Ontario, Canada
No Drawing. Filed Sept. 28, 1970, Ser. No. 76,239
Claims priority, application Great Britain, Oct. 2, 1969, 48,547/69
Int. Cl. B32b 5/16
U.S. Cl. 161—171                     20 Claims

ABSTRACT OF THE DISCLOSURE

A high performance composite of polymer and platelet reinforcing material, the platelets being of mica and of aspect ratio at least about 30. The platelets are of diameter within the range 1 to 1000 microns and 0.001 to 100 microns thickness, and constitute about 10 up to about 75% by vol. of the composite. The mica platelets are prepared and selected to be of high aspect ratio and strength. Techniques for separating into platelets, encapsulating the platelets with polymer, and for aligning the platelets in the matrix are described. Stress-strain properties of the composite are very good (particularly in the plane of alignment) indicating application as a structural material.

---

This specification describes the preparation of strong, rigid composites of mica and a polymeric material. While it is well known in the art that mica fillers will reinforce or stiffen plastic or elastic materials to some extent, the strength and modulus values obtained according to this invention are substantially higher than any previously reported. Since tough, strong, and rigid polymeric composites are especially important as a material of construction to replace the use of steel and aluminum, this discovery is believed to have considerable practical value.

This invention yields a high performance composite comprising a solid polymer and a mica reinforcing material, the mica material being in the form of platelets with an aspect ratio of at least 30, the amount of said material being from about 10% up to about 75% by volume of the composite, with the polymer substantially encapsulating each platelet.

This invention further yields a high performance composite comprising a solid polymer and a mica reinforcing material, the mica material being in the form of platelets of about 0.001 to 100 microns in thickness and aspect ratio of at least about 30, the amount of said material being from about 75% by volume of the composite, the polymer substantially encapsulating each platelet.

Mica represents a class of minerals (Phyllosilicates) made up of a number of different types having highly perfect basal cleavage, and is a member of the broad clay family, Biotite, Lepidolite, Muscovite, Phlogopite and Vermiculite are some varieties of mica. These mica materials can be finely subdivided and prepared in the form of thin sheets, flakes or plates ranging in thickness from 10 to 1000 angstroms. When very pure, such minerals exhibit very high strengths, and modulus values of 25 million p.s.i. have been reported. However such minerals are of course very brittle and cannot easily be fabricated into useful shapes. Therefore it is desirable to incorporate various amounts of such fillers into thermoplastic or thermosetting materials so that they can be moulded or extruded. Normally it is very difficult to incorporate fillers into plastics in such a manner that the desirable impact and strength properties of the plastic are not seriously impaired, and surface treatments offer marginal improvements in properties and the degree of improvement cannot be compared to the present case in which substantially improved reinforcement is observed.

Generally speaking, it is desirable to impart to the composite material the maximum modulus and strength inherent in the reinforcing filler. As a measure of the maximum modulus and strength which is theoretically realizable from a given filler, the "rule of mixtures" equation is often employed as a rough guide.

$$E_c = V_m E_m + V_f E_f$$

(Rule of mixtures equation) where:

$E_c$ = Young's modulus of composite
$E_m$ = Young's modulus of plastic matrix
$E_f$ = Young's modulus of reinforcing filler
$V_f$ = volume fraction of filler
$V_m$ = volume fraction of matrix It should be understood that by filler, any fibrous, spherical, or plate-like particle is implied, and that the matrix represents any plastic (thermoplastic or thermosetting) as the continuous phase. When Young's modulus is measured experimentally, it is usually observed that less than 20% of the expected value (from the rule of mixtures) is realized for typical composites. Therefore it was quite unexpected that values close to the theoretical could be obtained with mica according to the invention. A flexural modulus of 12.9 million p.s.i. at 30% volume loading (54% by weight mica) and a tensile strength in flexure of 8,000 p.s.i. have been obtained. This modulus value is believed to be considerably higher than the best commercially available plastic composites with the exception of those prepared with special graphite or boron fibers.

The precise conditions under which these exceptional properties were obtained with mica were found to be quite critical, perhaps accounting for the fact that previous investigators had failed to find this effect. The important considerations under which this unusually high degree of reinforcement can be obtained are summarized below.

(1) The mica should all be in the form of platelets which have a high aspect ratio, that is, the ratio of plate diameter to thickness should be greater than 30:1 and preferably from 50:1 to about 200:1.
(2) The modulus and strength of the mica platelets should be as high as possible.
(3) The polymer matrix must be firmly bonded to and surround the surface of the mica platelets.
(4) The modulus of the matrix should be kept high to permit efficient stress transfer at the interface.
(5) The individual platelets should be well dispersed in the matrix, and preferably aligned with a plane.

These conditions will be explained in greater detail and illustrated with examples.

THE IMPORTANCE OF ASPECT RATIO

Since the mica flakes are irregular in shape the definition of aspect ratio is arbitrarily taken to be based on the average diameter of the mica flake as determined from the relationship $\pi(\overline{D}/2)^2$ = area of flake, where $\overline{D}$ is the average diameter of the flake. Such determinations can be made visually by choosing a circle of the appropriate size which most nearly represents the area of flake. Microscopes are frequently fitted with calibrated eye pieces for such determinations.

Finely divided mica as prepared by common grinding techniques is a mixture of particles of various shapes with low average aspect ratio i.e. the average ratio of diameter to thickness is less than about 25. Common grinding or pulverizing leads to cracking or weakening of any platelets which may be produced. Therefore it is desirable to use careful delamination, size reduction and/or segregation techniques, examples of which will be described below.

A commercial product made by a wet grinding process has been found particularly useful for reinforcement. Such wet grinding, unlike the conventional dry grinding, accomplishes a gentle delamination over a period of hours with minimum scarring of the smooth surfaces of the tiny laminate. This product is characterized by a high lustre, due to the reflectance of millions of tiny, smooth, shiny flakes. The technical data for this product is given below.

| | |
|---|---|
| Raw material | Muscovite mica. |
| Theoretical formula | $H_2KAl_3(SiO_4)_3$. |
| Chemical activity | Essentially inert except to HF. |
| Specific gravity | 2.8–3. |
| Loss on ignition | 4–5%. |
| Index of refraction | 1.53. |
| Nominal particle size | 200 mesh. |
| Color | White and lustrous. |
| Particle shape | Very thin flakes. |
| Cleanliness | Washed and indirectly dried to avoid contamination. |

The importance of aspect ratio with respect to fibrous reinforcement is well known. Several corresponding theories have been proposed for plate-like reinforcing agents and the treatment is quite analogous. For efficient stress transfer to the matrix, a minimum or critical aspect ratio is important. If the aspect ratio is too low, then the full benefit of the reinforcing particle cannot be realized. However, there is no penalty if the plates are greater than the minimum aspect ratio needed. The platelet aspect ratio should be greater than 30:1 and preferably 50:1 to 200:1 or more (diameter to thickness). Good reinforcement has now been obtained with such high aspect ratio mica platelets.

The size of the particle is not critical, but should be selected to give other desired properties such as processability, mouldability or improved heat distortion. For good overall performance in polymer composites, mica platelets of about 1 to 1000 micron diameter and about 0.001 to 3 micron thickness, are preferred.

THE CHOICE OF REINFORCEMENT

Plate-like reinforcing fillers are preferred for several reasons. Although economics alone favour mica over many other potential reinforcing agents, mica also possesses other attractive properties, particularly high Young's modulus of 25 million p.s.i., and good chemical inertness. The strength of such plates is strongly dependent upon their crystalline perfection and hence it is important to separate the mica platelets with the greatest of care if strength is to be preserved. A comparison of mica with many other common reinforcing materials will readily indicate its attractiveness from the point of view of modulus (and specific modulus where the modulus is divided by the density to indicate the relative structural efficiency with respect to a given weight). Mica has a specific tensile strength and specific modulus greater than aluminum or steel.

Unlike fibers, plate-like reinforcing agents of high aspect ratio will impart up to 90% of their strength and modulus to the composite whereas fibers (when randomly distributed) will only impart 20%. When fibers are aligned however, as much as 80% of the strength and modulus can be obtained in one direction. Plates tend to spontaneously self-align and the platelets have been found to exhibit excellent orientation when subjected to moderate shearing action at high loadings. Simple moulding techniques can be employed to achieve good results which would not be possible with fibers. It is likely that with improved methods of mica delamination without harmful erosion of the platelets, further improvements in strength and modulus over the values given above should result. A further advantage of platelets over fibers is the reinforcement in a plane. Fibrous composites must be laminated together but composites made with platelets reinforce equally in all planar directions depending, of course, on the degree and direction of alignment. At high volume loadings, mica platelets tend to self-align, and it is evident that substantially complete alignment could be achieved by controlled drawing or shearing processes during the moulding operation. For example, the production of sheet moulding compounds (SMC) employ calendering operations which would materially aid preferential orientation in a plane. This type of extruded or rolled moulding stock containing aligned platelets, would be shaped and cured in a subsequent step.

FORMATION OF HIGH ASPECT RATIO FLAKES OF MICA

Commercially available grades of water-ground mica are not usually satisfactory for obtaining good reinforcement since they are generally of an average aspect ratio below about 40 (average diameter to thickness), and often contain numerous crystal imperfactions and low aspect ratio fines. Some of the best available materials gave average aspect ratios of 40 with a broad range of ratios of from 5 to 70. Therefore, it is preferred to fractionate the best commercial materials in order to select the higher aspect ratios, or more preferably, to prepare mica in suitable form directly from the raw materials. One reference has been noted in the patent literature for accomplishing this objective, by employing mechanical shearing methods and segregation in water (U.S. Pat. 3,390,045, June 25, 1968). It is important that the final product consist essentially of platelets which are whole and do not contain interlaminar flaws. Careful wet-grinding techniques are preferred for obtaining the reinforcing platelets.

Alternatively or in addition to that obtained by wet-grinding, cleavage to ultimate platelets can be carried out by a two roll mill in which a viscous material is used to gain purchase and shear the flakes apart with minimum turbulence (in order to minimize fracture of the flakes in the direction perpendicular to the cleavage planes). It becomes advantageous, therefore, to employ the matrix material or precursor thereof as the viscous medium, such as, for example, an epoxy resin, phenolic resol resin, polyester-styrene resin or any low molecular weight viscous resin which can later be cured or set to a hard, tough matrix. Polyester resins are particularly suitable since they can be subsequently thickened to a tough thermoplastic stage by the use of additives such as magnesium oxide or calcium oxide. A high temperature peroxide (dicumylperoxide for example) may be added during the mixing stage. This allows the composite to polymerize at the moulding temperature.

The shearing process for delaminating suitably sized mica particles is aided if the interlaminar forces are first weakened by swelling e.g. in water or aqueous salt solutions. The swelling is increased if the mico particles are soaked or boiled in salt solutions containing e.g. sodium chloride or lithium chloride.

Hydrated mico such as vermiculite spontaneously exfoliates at elevated temperatures. Such exfoliation is disadvantageous during processing or fabrication and therefore limits the usefulness of this material. Gentle shearing will complete the separation without causing significant platelet degradation. The opened flakes can be filtered and heated to remove excess liquid. The final shearing apart of the loosened platelets may be accomplished during the resin mixing stage e.g. on a two roll mill or a cone vertical mixer. The resin-mica mixture is then ready for conversion to sheet, preform or pellet form as desired, for use in moulding operations.

THE IMPORTANCE OF INTERFACIAL ADHESION

Fibers and flakes impart high strength and rigidity to a plastic material through forces acting at the interface between the two phases. High stresses are transferred to the reinforcing filler by the plastic matrix, the theory of which has been described. Failure usually takes place at fiber ends or at the edges of the platelets, where the highest stress concentration develops. For efficient stress transfer it is essential that there be good adhesion between the plastic matrix and the surface of the filler. Usually this is accomplished by the use of special chemical reagents known as coupling agents (to those experienced in the art), or the use of polymer components having a chemical affinity for or reactivity with the reinforcing filler surface. Examples are given below.

THE CHOICE OF MATRIX

Although most polymeric materials can be employed as matrix, it has been found that polymers containing ionic substituents are superior for the purposes of this invention. Vinyl polymers particularly polymers of acrylic acid, methacrylic acid, itaconic acid, fumaric acid, maleic acid or anhydride, 2-sulfoethylacrylate, or basic monomers such as vinylpyridine, dimethylaminoethylmethacrylate, etc. are particularly suitable. The major portion of the copolymers may consists of monomers such as styrene, acrylonitrile, acrylate esters, vinyl chloride, butadiene and unsaturated polyesters. Highly compatible blends or combinations of polymers, one component of which has strong adhesion to the mica surface, may be used. Epoxy resins, polyamides and polyesters, particularly those containing free carboxylic acid groups can be used. These acid groups tend to react with metals in or adsorbed on the mica surface. Added metal compounds can take part and are usually incorporated in the form of a powder or solution during the mixing stage prior to fabrication. The preferred metals are calcium, barium, zinc and magnesium, usually in the form of their oxides. The formation of such salts increases the modulus of the polymeric matrix, enhances the interfacial adhesion, raises the heat distortion temperature and increases the hardness of the composite. The following methods may be employed when compounding the flake materials with the resin system.

THE EFFECT OF VOLUME LOADING

As the level of filler is increased, the strength and modulus show a corresponding increase, and will reach a maximum value after which there will not be sufficient polymer to completely surround all the filler particles. The broad range is about 10 up to about 75% by vol. of the composite. The optimum filler level will depend on the balance of properties sought, but usually the amount is between about 40 and 60 volume percent for most applications. At such high levels the platelets have been found to be self-aligning under the influence of shear, as is visually evident from the test specimens and from electron microscope studies. Effect of volume loading in one system is illustrated in Example 4 below.

COMPOUNDING WITH A LIQUID RESIN

The mica platelets can be incorporated into a liquid intermediate stage resin with adequate mixing to accomplish complete wetting and encapsulation of each platelet. Thickeners, coupling agents, curing catalysts are then added and the mixture moulded with shear and cured at elevated temperature. An example of a preferred technique is as follows.

Mica having an aspect ratio greater than 100 and prepared by a known method (U.S. Pat. 3,390,045, June 25, 1968, Miller Jr. et al.) is mixed in a Cone vertical mixer or 2 roll mill with the desired ratio of polyester containinng unsaturation and terminal carboxyl groups and 70% by weight styrene). A thickening (and coupling) agent such as calcium oxide or magnesium oxide is added and mixed until uniformly dispersed. A high temperature radical initiator such as dicumylperoxide is added to the system. Such an initiator is stable at ambient temperature but is designed to polymerize the styrene at the moulding temperature which is usually near 150° C. The polymerization of the styrene also produces crosslinking by copolymerization with the unsaturated polyester, resulting in a thermoset composite.

Immediately following the compounding, the mixture is very viscous and smells strongly of styrene. On standing for several hours, the polyester undergoes a slow reaction with the added thickening agent (e.g. CaO or MgO) which results in a very stiff but pliable compound. When placed in a heated mould, the composition flows readily and requires relatively low pressures and temperatures to achieve satisfactory mouldings. Deformation with shear to the final shape causes alignment of the mica platelets.

LATEX COMPOUNDING

This technique is illustrated by the following example but variations will be obvious to those skilled in the art.

Copolymers of acrylic acid usually form stable emulsions in basic media. Platelets of mica may be added to such a stirred latex and the resulting mixture precipitated by the addition of barium or calcium acetate solution. The precipitate is then easily recovered by filtration and dried. The resulting dry powder may be compression moulded with shear to give extremely hard and rigid composites.

COATING OF MICA FLAKES BY SURFACE POLYMERIZATION

In many cases it is preferable to conduct the polymerization in the presence of mica flakes in such a manner that the resulting polymer forms a continuous coating which encapsulates the individual platelets prior to shaping by extruding or moulding. This approach considerably improves the quality of the moulded products and reduces the temperature and pressure needed to form a relatively void free composite. Encapsulated platelets may be produced by conducting the polymerization with an oil soluble free radical catalyst is aqueous suspension. Excellent results are obtained if a basic commonomer, such as dimethylaminoethylmethacrylate is added to the system. The polymerized mixture often forms uniform spherical particles several millimeters in diameter so that filtration and drying are greatly facilitated. Such well dispersed mixtures mould easily and produce clear or translucent specimens in less time and using lower mould temperatures and pressures than with simple latex compounding techniques.

Mica platelets of high aspect ratios tend to reform into laminar sheets unless surface treated to make them hydrophobic. Cationic monomers or polymers, or various unsaturated acidic monomers such as maleic acid can be adsorbed on the surface of such flakes to prevent reagglomeration and facilitate wetting and bonding of the polymeric matrix. Dimethylaminoethylmethacrylate is particularly useful for this purpose since it forms a strong bond with mica surfaces.

SOLUTION MIXING

Forming a solution of the polymer (or of an intermediate stage thereof) in a solvent which will wet the mica is sometimes feasible. The solvent is then evaporated from the mica-polymer mixture. Care must be taken in subsequent milling and moulding steps to avoid completely pulverizing the platelets.

DIRECT MELT COMPOUNDING

In most commercial operations fillers and reinforcing agents are directly blended into polymeric materials by high temperature mixing of the melt. Such mixing operations are attended by high shear conditions resulting in serious property degradation in the case of flake compositions. In this invention flake attrition or break down is reduced or eliminated during mixing by encapsulation of the mica flakes in the protective polymeric coating which may comprise a coupling agent plus a sizing agent, or film-forming polymer which may also become the matrix. A preferred melt compounding technique is to intimately mix the treated or encapsulated flakes and polymeric material in a compounding extruder followed by a pelletizer.

PRE-COATING

A pre-coating of the ultimate platelets with polymeric material to protect the platelets is a desirable step. Small amounts of polymer are formed on or coated on the individual platelets and set to give a protective layer. This layer may be of a different polymer from the bulk matrix i.e. the layer is chosen for its protective value or toughness. For instance tough coatings of different material from the matrix can be selected to give higher impact resistance to the composite.

MANUFACTURING PROCEDURE (SMC)

The polyester or other resin, after thorough mixing with the platelet material plus other additives, e.g. as shown in Table I, may be rolled out in continuous sheet form. The rolling or calendering helps to orient the flakes in the plane of the sheet, a factor which considerably improves flexural strength and modulus. The sheet may be stored in rolled up form until ready for use. The calendered sheets will stiffen on aging so that they become less sticky and dry to the touch. This facilitates handling and improves moulding characteristics. Such sheets may be used for matched die moulding or vacuum moulding, depending upon the application Alternatively, the compound may be pelletized for injection, compression, extrusion or transfer moulding.

solution was slowly added dropwise until precipitation was complete. The precipitate was stirred for an additional 5 minutes, then filtered and dried in an air oven at 60° C. The dry composite was moulded (with shear to give good platelet alignment) in a 50 ton compression mould at 6000 p.s.i. and 200° C. for 2 hours. After slow cooling, a test specimen 3" x 1" x 1/10" was removed from the mould and tested in flexure. The flexural modulus (span to depth ratio 20) was found to be $8.9 \times 10^6$ p.s.i. and flexural strength 46,000 p.s.i.

Example 2

A commercial sample of muscovite mica (Davenite P-4, Hayden Mica Co., U.S.A.) was separated via air elutriation using an Infrasizer (Infrasizers Ltd., Dept. of Mining Engineering, University of Toronto). The separated fractions were found to have different aspect ratios (average diameter of flake divided by the thickness) ranging from a low of 3 to a high of 70. These fractions where individually suspended in water and mixed with a specially prepared styrene-acrylic acid copolymer latex. The concentration of mica with respect to the polymer latex could be easily controlled in this manner. Intimate mixing of the mica and the latex was essential for best results. The acrylic acid groups are desirable to promote good interfacial adhesion and uniform coprecipitation. The charged latex particles adhered to the surface of the mica and the mixture was easily coagulated by the addition of a sataurated barium acetate solution. The precipitate was filtered, washed with distilled water and dried

TABLE I

| Materials | Type and/or purpose |
| --- | --- |
| Polyester resin | Rigid, flexible, flame-retardant, chemically resistant, terminal carboxyl groups. |
| Thickener (e.g. magnesium oxide, asbestos, calcium hydroxide etc.) | Flow control, viscosity, adhesion promoter. |
| Mica platelets | Aspect ratio greater than 30 for reinforcement. |
| Fillers (e.g. clay, calcium carbonate, magnesium silicate, silica, asbestos) | Mouldability, electrical properties, economics, chemical and flame resistance. |
| Release agents (e.g. stearates, organic phosphates, silanes) | Aid removal from mould. |
| Peroxide catalysts (e.g. benzoyl peroxide, dicumyl peroxide) | Cure of polyester at various temperatures. |

FLEXURAL STRENGTH

It has previously been observed that other flake composites usually had poor tensile and flexural strengths. However, the effect of aspect ratio was seldom taken into consideration. My studies with mica have shown that improved flexural strength is obtained when mica platelets with aspect ratio at least about 30 and with minimum imperfections are used, and in particular when (a) the mica is chemically treated with nitric acid, or aqua regia,
(b) the flakes are aligned in a plane, and
(c) the aspect ratio is greater than about 50.

Due to packing restrictions, the mica in the composites tends to self align, and this effect is particularly noticeable above 40 volume percent. A distinct improvement in the flexural strength is noted at these higher volume loadings. It is important that the platelets do not contain weak interlaminar planes which might fail under shearing conditions. Although mica platelets are composed of many parallel laminae bonded together, they are perhaps superior to single crystal flakes in resistance to marring. Surface imperfections on mica platelets do not lead to catastropic failure as in the case of silicon carbide or aluminum boride flakes since the flaw is not as easily propagated through the crystal layers.

Further examples are given to illustrate the invention.

Example 1

Muscovite mica platelets 15.4 g. with an average aspect ratio of 60 were dispersed in 4.5 g. copolymer latex (dry weight). The copolymer contained 95 mole percent styrene and 5 mole percent acrylic acid and was prepared by a standard emulsion polymerization method. After 30 minutes agitation, a saturated aqueous barium acetate in an oven at 70° C. The mica content was accurately determined by ashing the polymer composite. A dry sample was compression moulded with sheer into test pieces 1" x 3" x 1/10" for flexural measurements. The results in Table II show the importance of aspect ratio for achieving high modulus.

TABLE II

Effect of aspect ratio on flexural properties of mica composites at 60 volume percent

| Mica aspect ratio | Flexural strength, p.s.i. | Flexural modulus, $\times 10^6$ p.s.i. |
| --- | --- | --- |
| 3 | 13,000 | 3.5 |
| 30 | 27,000 | 6.5 |
| 60 | 41,000 | 9.2 |
| 70 | 44,000 | 9.3 |

Example 3

This example employs a ductile polymer, Lexan (trademark) polycarbonate resin (General Electric Company, U.S.A.) as the matrix. The mica was separated with an Infrasizer into average aspect ratios of 20 and 40. A quantity of each sample was dispersed in a solution of polycarbonate resin in methylene chloride and the mixture evaporated to dryness in large aluminum trays. The dry film was cut into strips and compression moulded with shear into 3" x 1" x 1/8" test bars at 8000 p.s.i. and 230–280° C. for 30 minutes. The ratio of mica to polycarbonate resin was varied to cover a range of compositions. Flexural tests were carried out according to ASTM D790–66.

The results for two volume loadings are reported below.

TABLE III

| Aspect ratio | Volume fraction | Flexural modulus, p.s.i.×10⁶ | Flexural strength, p.s.i.×10³ |
| --- | --- | --- | --- |
| 20 | 0.63 | 4.60 | 22.7 |
| 40 | 0.63 | 6.96 | 31.1 |
| 12 | 0.35 | 2.60 | 20.1 |
| 30 | 0.35 | 4.10 | 27.0 |

The advantage of using a higher aspect ratio is clearly evident. While platelet alignment was good, improved moulding techniques giving optimum alignment would improve properties still further.

Example 4

This example illustrates the effect of volume loading on the composite flexural properties. Styrene (20.8 gm., 0.2 mole) and dimethylaminoethyl methacrylate (1.58 gm., 0.01 mole) were added to a stirred suspension of muscovite mica platelets in 100 ml. distilled water. The mica was previously separated by air elutriation using an Infrasizer in order to isolate the portion having an aspect ratio of 70. Acid treatment of the mica (in boiling aqua regia, nitric acid:hydrochloric acid 3:1), was carried out to convert the surface of the mica to an acidic state which would react strongly with the basic comonomer with the formation of ionic bonds. The mixture was purged with nitrogen and 0.02 gm. azobisisobutyronitrile catalyst added to promote polymerization. This mixture was stirred and heated for 16 hours at 60° C. when the polymerization was complete. The resulting precipitate consisting of crumbs containing mica platelets completely encapsulated with the copolymer, was filtered, washed, and oven dried at 70° C. The dry powder was easily moulded with shear into rectangular test specimens (1" x 3" x 1/10") at 200° C. and 20,000 p.s.i. for 30 minutes. After slow cooling the samples were tested according to ASTM D-790 for flexural strength and flexural modulus. These results are given in Table IV.

TABLE IV

Effect of volume loading of muscovite mica on Flexural Modulus and Flexural Strength

[Aspect ratio=70]

| Volume fraction, mica | Flexural modulus, p.s.i.×10⁶ | Flexural strength, p.s.i.×10³ |
| --- | --- | --- |
| .25 | 3.25 | 10.1 |
| .35 | 5.10 | 13.8 |
| .45 | 6.9 | 16.0 |
| .60 | 9.8 | 17.0 |

Example 5

Phlogopite mica was prepared in a colloid mill and sieved to obtain a final product of aspect ratio 50. Sixty gms. of the phlogopite were treated with a silane coupling agent (Union Carbide A-1112) to promote interfacial adhesion prior to addition to 500 ml. of oxygen-free distilled water and 20 gms. of styrene monomer. 0.02 gm. of azobisisobutyronitrile catalyst was then added, the mixture placed in a 32 ounce "pop" bottle and flushed with purified nitrogen before capping. The mixture was polymerized with end-over-end agitation for 72 hours at 60° C. The coarse precipitate was easily filtered, washed, and dried. The dry moulding powder (28 grams) was compression moulded at 200° C. and 5000 p.s.i. and the specimen slowly cooled. The resulting test bar (0.13" x ¾" x 8.5") was tested in flexure using a 4" span. The flexural modulus was $10.6 \times 10^6$ p.s.i. and the flexural strength $12.9 \times 10^3$ p.s.i.

I claim:
1. A high performance molded composite comprising a solid organic polymer matrix and a mica reinforcing material, the mica material being in the form of platelets of about 1 to 1000 micron diameter, about 0.001 to 3 micron thickness and segregated with respect to aspect ratio to have an aspect ratio of at least about 30, the amount of said material being from about 10 up to about 75% by vol. of the composite, the polymer spacing apart and encapsulating each platelet, and the platelets being substantially aligned.
2. The composite of claim 1 wherein the platelets are from about 40 to 60% by vol. of the composite.
3. The composite of claim 1 wherein the mica aspect ratio is above about 50.
4. The composite of claim 1 wherein the platelets are substantially free of imperfections.
5. The composite of claim 1 wherein the platelets have been surface treated with nitric acid or aqua regia.
6. The composite of claim 1 including added coupling agent.
7. The composite of claim 1 wherein the polymer is vinylic.
8. The composite of claim 1 wherein the polymer contains groups which have a chemical affinity for the mica surface.
9. The composite of claim 1 wherein the polymer contains free carboxylic acid groups.
10. The composite of claim 7 wherein the vinyl monomer includes an unsaturated carboxylic acid.
11. The composite of claim 1 wherein the polymer is a thermosetting polyester resin or phenolic resin.
12. The composite of claim 1 wherein the polymer is thermosetting and is in an intermediate state of cure.
13. The composite of claim 7 wherein a basic monomer selected from the group consisting of dimethylaminoethyl methacrylate and vinyl pyridine is polymerized.
14. The composite of claim 1 wherein the polymer contains oxides of metals selected from Mg, Ca, Zn and Ba.
15. A high performance composite comprising a solid organic polymer and a mica reinforcing material, the mica material being in the form of platelets segregated with respect to aspect ratio to have an aspect ratio of at least about 30, the amount of said material being from about 10 up to about 75% by volume of the composite, the polymer spacing apart and substantially encapsulating each platelet.
16. The composite of claim 15 wherein the polymer matrix is a thermoplastic polymer.
17. The composite of claim 15 wherein the polymer matrix is a thermosetting polymer.
18. The composite of claim 15 wherein the mica is chosen from the group consisting of muscovite and phlogopite.
19. The composite of claim 15 wherein the mica platelets are of about 0.001 to about 100 microns in thickness.
20. The composites of claim 15 wherein each high aspect ratio platelet has been initially encapsulated and protected by polymer.

References Cited

UNITED STATES PATENTS

| | | | |
| --- | --- | --- | --- |
| 3,271,355 | 9/1966 | Vanderbilt et al. | 260—41 A |
| 3,519,593 | 7/1970 | Bolger | 260—41 A |
| 3,580,882 | 5/1971 | Nielsen et al. | 260—41 A |
| 3,215,590 | 11/1965 | Purvis | 161—163 |
| 3,390,045 | 6/1968 | Miller, Jr. et al. | 264—110 |

WILLIAM J. VAN BALEN, Primary Examiner

U.S. Cl. X.R.

106—Digest 3; 161—171; 264—110